July 7, 1959
R. L. RYSHAVY
2,893,793
OIL-IMPREGNATED BEARING HAVING MOLYBDENUM SULFIDE
COATING AND METHOD OF MAKING SAME
Filed March 9, 1954
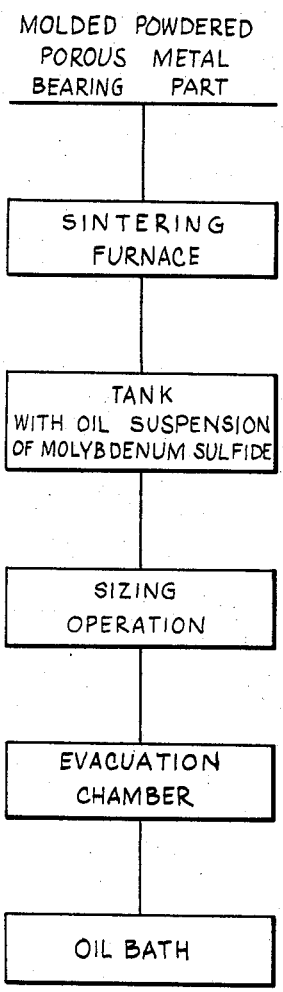
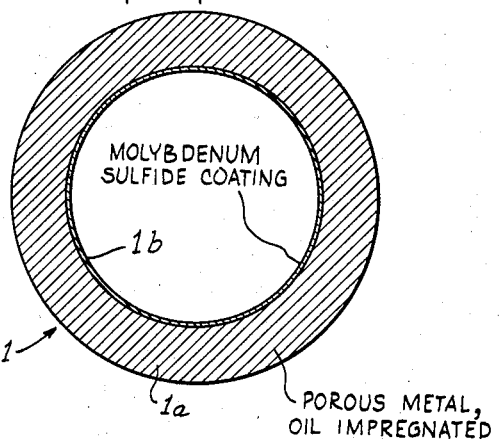
INVENTOR.
RUDOLPH L. RYSHAVY
BY
Robert A. Dunham
ATTORNEY

United States Patent Office 2,893,793
Patented July 7, 1959

2,893,793

OIL-IMPREGNATED BEARING HAVING MOLYBDENUM SULFIDE COATING AND METHOD OF MAKING SAME

Rudolph L. Ryshavy, North Plainfield, N.J., assignor to Bound Brook Oil-Less Bearing Company, Bound Brook, N.J., a corporation of New Jersey Application March 9, 1954, Serial No. 415,102

4 Claims. (Cl. 308—240)

This invention relates to oil-impregnated porous bearings and to methods of making such bearings. It particularly relates to such bearings having a coating of molybdenum sulfide ($MoS_2$) and methods of forming such coatings.

There have been commercially available for many years oil-impregnated bearings of porous material, for example bronze. The oil in the porous material gradually feeds to the running surface of the bearing, and the bearings therefore require no external lubrication. Such bearings commonly last longer than the machines in which they are used, without any external lubrication. However, it sometimes happens that the supply of oil at the working surface of such a bearing may fail, for example, temporarily under exceptionally heavy load conditions, or permanently due to complete consumption of the internal supply over a long period of time. It is therefore desirable to provide such bearings with a secondary lubricant material which will become effective when the original oil supply is used up or for some reason becomes temporarily ineffective.

It has been known for many years that molybdenum sulfide has substantial lubricating qualities under dry conditions. Its use as a bearing material has been suggested, and it is finding increasing use in connection with certain specific and difficult lubrication problems. It is commonly used by applying a relatively thin coating to a metal surface. The underlying metal is usually steel or some other metal which is not commonly used for bearing purposes. Various methods have been suggested for applying a molybdenum sulfide coating to such surfaces. Among the methods suggested are: dusting the surface with dry molybdenum sulfide powder and then rubbing the powdered surface; forming a paste of molybdenum sulfide with a suitable vehicle such as a heavy oil or grease and rubbing it on the surface; and forming a suspension of molybdenum sulfide in a suitable binder such as varnish, and painting it on the surface. These coating methods, if applied to a porous bearing material such as is used in oil-impregnated bearings, have a tendency to clog the pores of the bearing material with the molybdenum sulfide, with the result that the oil in the bearing material could not reach the surface of the bearing. Furthermore, all these methods are relatively expensive and require considerable care.

It has been suggested that porous bearings might be made by including molybdenum sulfide powder in the mixture of materials from which the bearing is formed. Such an arrangement provides an effective bearing, but is wasteful of molybdenum sulfide, since the sulfide within the body of the bearing structure has no working function, only the molybdenum sulfide on the surface being effective.

A typical process of making a commercial oil-impregnated porous bronze bearing comprises the following steps: A mixture of copper, tin and graphite porous material in suitable proportions is first molded to form an oversize bearing part. The molded bearing part is then sintered, thereby alloying the copper and tin to form bronze. The sintered part is then coated with a suitable lubricant and is then passed through a sizing operation. In the sizing operation, the part is compressed in a suitable die to its desired final size, the compressive forces being applied particularly to the working surface of the part. The lubricant applied just before the sizing process facilitates that process, reducing the friction between the bearing part and the die, and thereby reducing the amount of the powder required. After the sizing process, the part is placed in a chamber which is evacuated for a substantial time. The object of the evacuation is to draw as much air as possible out of the porous bearing part. While still under a vacuum, the part is covered with oil, and then the vacuum is released above the surface of the oil, so that atmospheric pressure becomes effective to drive the oil into the evacuated porous bearing.

An object of the present invention is to provide an oil-impregnated porous bearing having a coating of molybdenum sulfide.

Another object is to provide a process of making such a bearing.

Another object is to provide a process of coating porous metal articles with molybdenum sulfide.

Another object is to provide such a bearing and a process for making the same which is economical of molybdenum sulfide and which is adaptable for use in connection with present commercial processes for making such bearings. Another object is to provide such a process which is economical of time and effort.

The foregoing and other objects of the invention are attained by forming the bearing parts and sintering them according to the prior process and then dipping the sintered parts in an oil suspension of molybdenum sulfide. During this dip process, the porous parts take up oil quickly, and the oil flowing into the parts deposits its molybdenum sulfide content on the outer surface of the parts. The parts are then passed through a conventional sizing operation which now has the additional function and effect of rubbing the molybdenum sulfide and substantially welding a thin coating thereof onto the working surfaces of the bearing. The parts are then passed through a conventional vacuum and oil impregnation step. This oil impregnation step now has the further function and effect of removing from the bearing parts any loose molybdenum sulfide which is not united with the surface of the bearing parts during the sizing step.

Other objects and advantages of the invention will become apparent from a consideration of the following specification, taken together with the accompanying claims and drawing.

In the drawing:

Fig. 1 is a flow sheet illustrating diagrammatically a process embodying the invention;

Fig. 2 is a perspective view of a bearing part produced by the process of Fig. 1, and Fig. 3 is a cross-sectional view, taken on the line III—III of Fig. 2.

A specific example of a process according to the flow sheet of Fig. 1, and the product of that process will now be described. This process is described only by way of illustration of the invention, and not by way of limitation.

The metallic powders which are to form the porous body of the bearing are first mixed in the desired proportions. Typically, to form a porous bronze bearing, there may be made a mixture of 89.5% copper, 9.5% tin and 1% graphite. Other materials, such as, for example, iron-copper mixtures, powdered iron, and powdered brass, may be similarly treated.

This mixture is then compacted in a mold having the shape of the desired part, but somewhat oversize. In forming porous bearings such as this, the porosity or density of the bearing structure is controlled by regulating the weight of the material which is compacted into the mold with respect to the volume of the finished part. For the purposes of the present invention, it is preferred to make a bearing body which is substantially more porous than the bearing materials commonly used. For example, a typical bearing material in common use has 23% porosity, whereas a bearing intended for use in connection with the present invention should have a porosity about 33%. The higher porosity allows the retention of a substantially greater volume of oil in the bearing, and also provides a greater number of pores and larger pores in the bearing surfaces, for a purpose to be described below.

After the powder is compacted, the bearing part so formed is sintered in a furnace at a temperature of 1500° F. for thirty minutes. During the sintering operation the copper and tin alloy to form bronze. Sintering times and temperatures vary greatly with different materials, as is well-known in the art.

The sintered part is then dipped for a few seconds in a tank containing an oil suspension of molybdenum sulfide. The sintered part in its present condition absorbs oil rapidly, with approximately the same speed that a sponge takes up water. As the oil carrying suspended molybdenum sulfide flows into the pores of the part, the suspended molybdenum sulfide is deposited on the surface of the part. This dip treatment should be continued for only a few seconds. If continued for a time long enough so that the flow of oil into the pores stops, then the oil in the tank may tend to carry away the deposited molybdenum sulfide. It is preferred to keep the molybdenum sulfide suspension at a temperature of 150° F. during this dipping operation, so that the oil will flow more rapidly. An oil having a grade of SAE 20 with a viscosity of 300 Saybolt-seconds has been found to be satisfactory. The oils used in different instances may vary widely in their characteristics. The suspension is prepared from natural molybdenite which has been purified and specially treated to remove all the abrasive particles. Such a product is now commercially available. The molybdenite is pulverized until the particle diameters are in the range of 0 to 70 microns. The suspension is then prepared by mixing 4% by weight of the pulverized molybdenum sulfide with 96% by weight of the oil. It is considered that a substantially lower percentage of molybdenum sulfide could be successfully used if it were ground more finely. However, the percentage composition of the suspension mentioned above works very well with the fineness of grind indicated.

After the parts are removed from the dipping process, which as noted above should continue for only a few seconds, e.g., less than five, the parts are passed on to a sizing operation. The sizing operation is conventional in the formation of porous oil-impregnated bearing parts. The parts are originally molded somewhat oversized and are then compressed to the desired size. In the sizing operation, the parts are placed in a mold of desired size and are then compressed to fit the mold by a core piece or pin which moves relative to the working surface of the bearing. This core piece not only compresses the working surface in a direction to perform the required compression, but also slides over that surface in a direction transverse to the compressive movement. In the process embodying the present invention this sliding and compressive movement of the core piece is effective to firmly unite a layer of the molybdenum sulfide with the underlying porous metal. It is considered that this union of the sulfide coating with the metal is in the nature of a weld.

After the sizing operation, the surfaces of the parts, especially those surfaces which were not subjected to compression or rubbing action, may have excess quantities of molybdenum sulfide clinging to them. This loose molybdenum sulfide performs no useful function in the operation of the bearing. It is removed in the subsequent steps, which are similar to steps conventionally used in the manufacture of porous oil-impregnated bearings.

The first of these subsequent steps is to place the sized bearing parts in an autoclave where they are subjected to a high vacuum for a substantial period of time. For example, a vacuum of 28" of mercury for a time of about ten minutes is typical. The purpose of this vacuum treatment is to draw as much air as possible out of the pores of the bearing part.

After the vacuum treatment, oil is fed into the vacuum chamber in sufficient volume to cover the bearing parts. After the parts are so covered the vacuum in the chamber is released. The atmospheric pressure on the surface of the oil then becomes effective to drive oil into the previously evacuated pores of the bearing, so that they become thoroughly impregnated with the oil. The bearing parts are allowed to remain immersed in this oil for a substantial period of time, for example fifteen or twenty minutes. During this time the oil is effective to wash from the bearing surfaces any molybdenum sulfide particles which are clinging there loosely and which have not been firmly united with the surface of the bearing part.

From the foregoing, it may be seen that the dipping step, which is added to the prior art process to provide the desired molybdenum sulfide coating, is extremely simple and fast, and readily adaptable to the use of automatic machinery. Furthermore, the sizing and final oil bath steps, which were common in prior processes, perform additional functions in the process of the present invention. The additional function of the sizing operation is to weld on a coating of molybdenum sulfide, and the additional function of the final oil bath is to wash away as many as possible of the loose particles of molybdenum sulfide.

A bearing part formed by the foregoing process is illustrated in Figs. 2 and 3. As there shown, a part 1, of generally cylindrical form, comprises a body portion 1a of oil impregnated porous metal, with a coating 1b of molybdenum sulfide on its working surface, which is its internal or concave surface.

Bearings formed in accordance with the foregoing process have highly useful characteristics. It is found that while some of the smaller pores in the working surface of the bearing may be clogged by the molybdenum sulfide, a major proportion of the pores are not so clogged. The pores thereby remain effective to supply oil from the body of the bearing to the working surfaces of the bearing when it is in operation. The use of a material more porous than normal when forming the bearing contributes substantially to this result.

Bearings constructed in accordance with the invention have withstood rigorous tests without failure.

While I have shown and described a preferred embodiment of my invention, other modifications thereof will readily occur to those skilled in the art and I therefore intend my invention to be limited only by the appended claims.

I claim:

1. The method of making an oil-impregnated porous bearing having a porous molybdenum sulfide coating, comprising the steps of compressing a quantity of metal powders free of molybdenum sulfide to form an oversize bearing element, sintering said element, dipping said element, sintered and dry, in an oil suspension of pulverized molybdenum sulfide for a time not greater than five seconds, so that some of the oil flows into the pores of the element, thereby depositing on the surfaces of the element a coating of molybdenum sulfide sufficient to fill a portion only of the surface pores of the element, and then compressing said element to a substantially smaller size by the application of pressure and rubbing action to the working surfaces of said element, thereby welding said coating of molybdenum sulfide to said working surfaces.

2. The method of making an oil-impregnated porous bearing having a porous molybdenum sulfide coating, comprising the steps of compressing a quantity of metal powders free of molybdenum sulfide to form a part having a porosity of about 33%, sintering said part, dipping said part, sintered and dry, in a suspension of pulverized molybdenum sulfide for a time not greater than five seconds, thereby depositing on its surfaces a coating of molybdenum sulfide sufficient to fill a portion only of the surface pores of the part and then compressing said part to a final size substantially smaller than its original dimensions by the application of pressure and rubbing action to the working surfaces of said part, thereby welding said coating of molybdenum sulfide to said working surfaces.

3. The method of making an oil-impregnated porous bearing having a molybdenum sulfide coating, as defined in claim 2, comprising the further step of subjecting said sized part to a high vacuum for several minutes, immersing the part in oil while maintaining the vacuum, then releasing the vacuum acting on the surface of the oil, and allowing the part to stand in the oil for several minutes, thereby removing unwelded molybdenum sulfide particles from the non-working surfaces of the part.

4. A self-lubricating bearing comprising a body of porous bearing metal having working surfaces and impregnated with oil constituting the only reservoir of liquid lubricant for the working surfaces, and a porous coating of molybdenum sulfide welded on the working surfaces, said body except for its surfaces being substantially free of molybdenum sulfide, said porous coating and body being normally effective to supply oil from the reservoir to the working surfaces, said coating being effective to lubricate the bearing in the event of failure of said supply of oil.

References Cited in the file of this patent

UNITED STATES PATENTS

| | | |
|---|---|---|
| 1,964,671 | Nesbitt | June 26, 1934 |
| 2,187,086 | Koehring | Jan. 16, 1940 |
| 2,361,211 | Kalischer | Oct. 24, 1944 |
| 2,364,713 | Hensel | Dec. 12, 1944 |
| 2,387,872 | Bell | Oct. 30, 1945 |
| 2,418,881 | Hensel et al. | Apr. 15, 1947 |
| 2,562,595 | Blue | July 31, 1951 |
| 2,697,645 | Mitchell | Dec. 21, 1954 |

FOREIGN PATENTS

| | | |
|---|---|---|
| 677,240 | Great Britain | Aug. 13, 1952 |

OTHER REFERENCES

Sonntag: Iron Age, vol. 167, No. 6 (1951), pages 91–93.

UNITED STATES PATENT OFFICE

CERTIFICATE OF CORRECTION

Patent No. 2,893,793                                  July 7, 1959

Rudolph L. Ryshavy

It is hereby certified that error appears in the printed specification of the above numbered patent requiring correction and that the said Letters Patent should read as corrected below.

Column 2, line 10, for "powder" read -- power --.

Signed and sealed this 1st day of December 1959.

(SEAL)
Attest:

KARL H. AXLINE
Attesting Officer

ROBERT C. WATSON
Commissioner of Patents